United States Patent [19]

Olsen et al.

[11] E Re. 31,416

[45] Reissued Oct. 18, 1983

[54] ELECTRIC SIGNAL TRANSMITTER FOR VIBRATING-WIRE SENSOR

[75] Inventors: Everett O. Olsen, Wrentham; Donald C. Simpson, Norton; David A. Richardson, Sheldonville, all of Mass.

[73] Assignee: The Foxboro Company, Foxboro, Mass.

[21] Appl. No.: 161,123

[22] Filed: Jun. 19, 1980

Related U.S. Patent Documents

Reissue of:

[64] Patent No.: 4,118,977
Issued: Oct. 10, 1978
Appl. No.: 732,129
Filed: Oct. 13, 1976

[51] Int. Cl.[3] ..... G01L 1/10

[52] U.S. Cl. ..... 73/862.59; 73/DIG. 1

[58] Field of Search ..... 75/DIG. 1, 517 AV, 704, 75/778, 141 R

[56] References Cited

U.S. PATENT DOCUMENTS

| | | | |
|---|---|---|---|
| 2,513,678 | 7/1950 | Rieber | 73/DIG. 1 |
| 2,926,247 | 2/1960 | Palmer . | |
| 3,046,789 | 7/1962 | Boss | 73/DIG. 1 |
| 3,067,615 | 12/1962 | Holmes | 73/DIG. 1 |
| 3,071,725 | 1/1963 | McWaid . | |
| 3,483,753 | 12/1969 | Loeb | 73/DIG. 1 |
| 3,543,585 | 12/1970 | Brown . | |
| 3,683,684 | 8/1972 | Judlowe | 73/DIG. 1 |

*Primary Examiner*—Charles A. Ruehl
*Attorney, Agent, or Firm*—Parmelee, Bollinger & Bramblett

[57] ABSTRACT

A force-measuring instrument of the vibrating-wire type wherein the mechanical components are located at the force-measuring location and the vibrating wire is coupled through a two-wire transmission line to electronic circuitry at a distant location. The electronic circuitry includes means to excite the vibrating wire and to produce a d-c measurement output signal corresponding to the frequency of vibrations. The electronic circuitry further includes function-generating means to establish a closely-linear relationship between the output current and the force applied to the wire. Means also are incorporated in the electronic circuitry for adjusting the zero and span of the instrument, and this can be done without interaction between the adjustments.

33 Claims, 2 Drawing Figures

ELECTRIC SIGNAL TRANSMITTER FOR VIBRATING-WIRE SENSOR

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to industrial process instruments for producing an electrical measurement signal corresponding to a pressure or force. More particularly, this invention relates to such instruments of the vibrating-wire type.

2. Description of the Prior Art

It has been well known for many years that a taut wire will have a vibrational resonant frequency related to the tension in the wire. It also has been long recognized that this characteristic can serve as the basis for a pressure or force-measuring instrument, as by tensioning a vibratable wire in accordance with a force to be measured, causing the wire to vibrate at its resonant frequency, and producing a measurement signal corresponding to that frequency. Theoretical considerations applicable to such devices indicate that they should be capable of extremely accurate measurements, and thus substantial effort has been devoted to the development of such apparatus. Out of this effort has come a considerable number of proposals for various kinds of instruments, and some designs have been offered commercially. Moreover, there is substantial patent art relating to such instruments; a selection of relevant disclosures (not herein asserted to be a complete presentation of all such art) may be found in U.S. Pat. Nos. 2,445,021, 3,046,789, 3,071,725 and 3,543,585.

Notwithstanding the extensive work that has been done in this field, there has as yet been no instrument made available which is truly suitable for application to industrial processes. In part, this is because the instruments offered to date have not met important performance requirements, such as reliably achieving high accuracy of measurement. In addition, prior instrument designs of this character were not suited to serve as field-mounted units capable of interconnection into an overall instrumentation system, e.g. of the type having an instrument station where various measurement and/or control functions are coordinated.

SUMMARY OF THE INVENTION

In one preferred embodiment of the invention to be described hereinbelow, there is provided a vibrating-wire instrument wherein the relatively rugged mechanical components of the instrument are adapted to be field-mounted adjacent the pressure or force to be measured and interconnected by a simple two-wire transmission line to the somewhat less rugged electronic signal transmitter apparatus at a distant location, away from adverse local environmental effects at the point of measurement. This electronic apparatus includes an oscillator which supplies over the two-wire line all of the energy needed to maintain the taut wire vibrating at its resonant frequency. The mechanical resonant characteristics of the wire are reflected back to the oscillator through the two-wire line to set the oscillator frequency in accordance with the unknown force to be measured.

The transmitter circuitry also includes means to provide a non-linear transfer function between the oscillator frequency and the output measurement signal. It has been found that such characterization of the signal provides significantly improved accuracy by establishing a substantially linear relationship between the unknown force and the output measurement signal. Moreover, this transmitter advantageously includes special electronic means to effect adjustments of instrument "zero" and "span" remotely from the mechanical components at the point of measurement, with the adjustments being non-interactive.

Accordingly, it is an object of this invention to provide an improved force or pressure-measuring instrument of the vibrating-wire type. A more specific object of this invention is to provide such an instrument which is particularly well suited for use in an industrial process instrumentation system. Other objects, aspects and advantages of the invention will in part be pointed out in, and in part apparent from the following description considered together with the accompanying drawings.

DESCRIPTION OF THE PREFERRED EMBODIMENT

Figure 1:
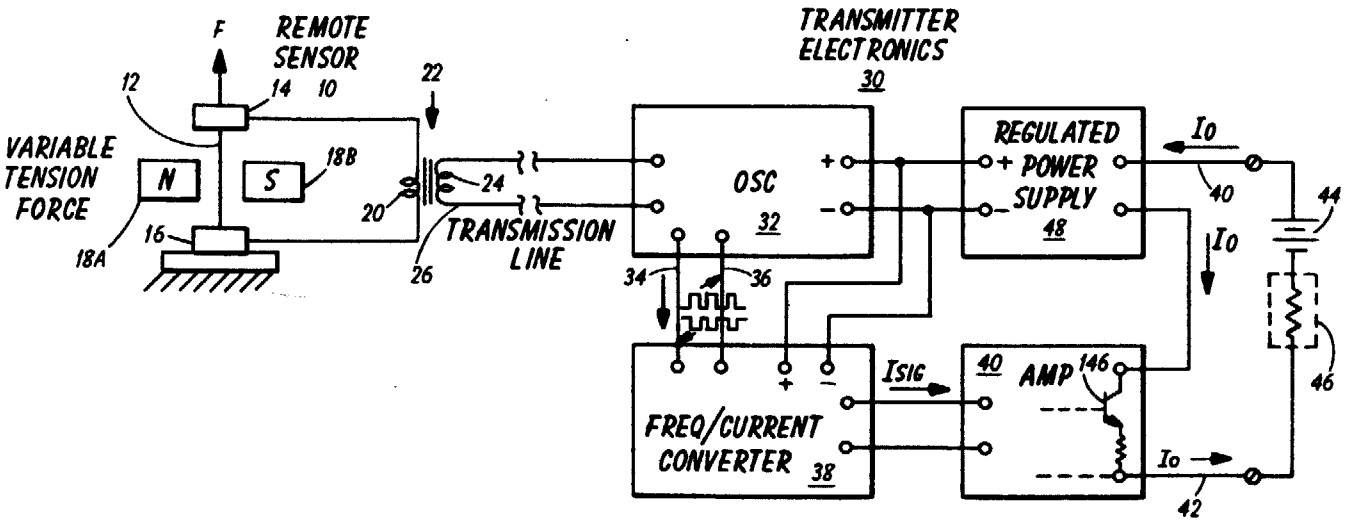
FIG. 1 is a schematic diagram, partly in block form, showing a preferred instrument in accordance with the invention.

Referring now to the left-hand portion of FIG. 1, there is shown in somewhat diagrammatic form the basic mechanical components of a vibrating-wire force-sensor 10. These components include an electrically-conductive wire 12 held tautly between a pair of terminals 14, 16, and disposed in the air-gap between the poles 18A, 18B of a permanent magnet arranged to develop a magnetic field perpendicular to the axis of the wire.

These mechanical components of the instrument are located at a remote station next to the force or pressure to be measured. As indicated by the vertical arrow adjacent the top of the wire, a force F of unknown magnitude is applied to the wire 12 to control the tensioning thereof so that its resonant frequency of vibration will be a function of the force. Details of such a vibrating-wire force-sensor, including suitable means for developing the wire tensioning force in accordance with a differential pressure, are shown in copending application Ser. No. 732,130, filed by Everett O. Olsen and Howard W. Nudd, Jr. et al on Oct. 13, 1976.

The wire terminals 14, 16 are connected to respective ends of one winding 20 of a transformer 22. The other transformer winding 24 is connected to the leads of a two-wire transmission line 26 extending between the remote field location of the force-sensor 10 and another station distant from the sensor. The far end of the transmission circuitry 30 which will be described hereinbelow in detail.

In brief, this circuitry 30 includes an oscillator 32 which operates in conjunction with the resonant characteristics of the vibrating wire 12, as reflected through the transformer 22 and the transmission line 26, to produce a square-wave oscillatory current at the resonant vibrational frequency of the wire. This square-wave signal is directed through the line 26 to the wire 12 to excite the wire and sustain its vibrations. The transformer 22 advantageously has a relatively high turns-ratio, e.g. about 30:1, and serves to provide an effective impedance match between the characteristics of the wire 12 and the wire-excitation circuitry including the transmission line. The transformer also enhances the signal-to-noise ratio of the signal transmitted through the transmission line.

The oscillator 32 produces a pair of square-wave switch-control signals on respective leads 34, 36 connected to a frequency-to-current converter 38. The signal current from this converter is directed to a power amplifier 40 which produces a corresponding output measurement signal in another two-wire line 42 including a source 44 of D-C power in series with a signal-receiving instrument, illustrated as a resistor 46, and which may be a recording instrument or the like. Current from the source 44 provides power for a regulated power supply 48 which furnishes stabilized operating voltages to the oscillator 32 and the frequency-to-current converter 38.

Figure 2:
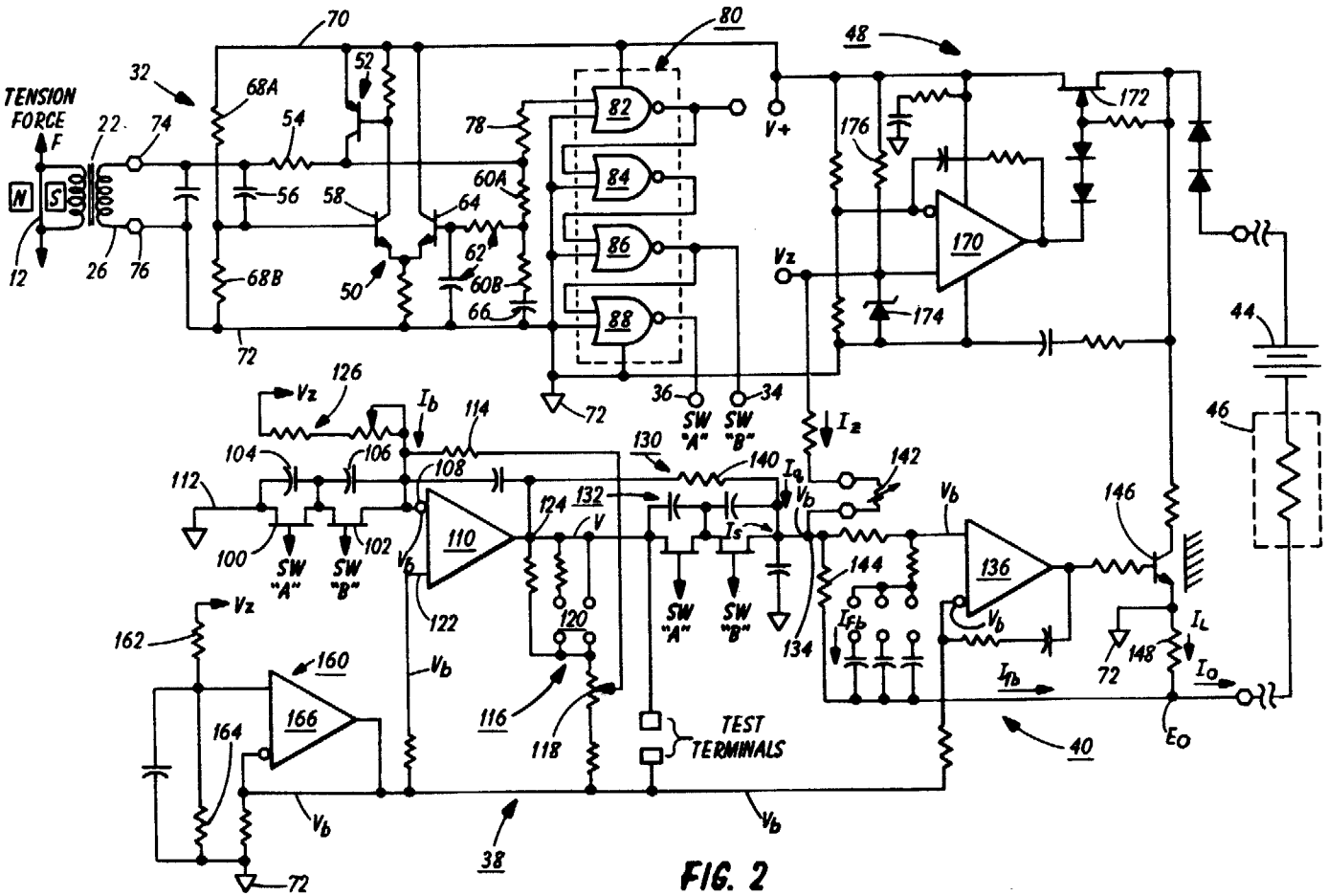
FIG. 2 is a detailed circuit diagram of the electronic transmitter elements of the instrument of FIG. 1.

Referring now to FIG. 2, which shows details of the electronic circuitry of the transmitter 30, it will be seen that oscillator 32 includes a differential amplifier 50 driving another amplifier 52 the output of which is connected through split positive feedback paths to the two inputs of the differential amplifier 50. The left-hand feedback path passes through a resistor 54 and a capacitor 56 to the base of transistor 58, and the other feedback path passes through a resistive voltage-divider 60A, 60B and an RC lag network 62 to the base of transistor 64. A capacitor 66 in series with the voltage-divider 60 establishes a relatively high d-c bias for transistor 64 to provide for square-wave oscillations within the operating range of the transistor. Another resistive voltage-divider 68A, 68B, between the positive supply lead 70 (V+) and circuit common 72, provides proper operating bias level for the transistor 58.

The lag network 62 slows down the leading edges of the square waves coupled from amplifier 52 to the transistor 64. This is for the purpose of establishing a transistory bias for the differential amplifier 50 so as to prevent short-duration high-frequency damped wave trains, which follow the leading edges of the square waves applied to the transistor 58 as a result of the leakage parameters of the transformer 22, from interfering with the sharp switching of the amplifier 50. In operation, this amplifier switches from one state to the other at the times corresponding to the zero crossings of the voltage induced in the vibrating wire 12.

The transmission line terminals 74, 76 are coupled to the positive feedback path, described above, which extends between the amplifier 52 and the transistor 58, and the mechanical resonant characteristics of the vibratory wire 12 are reflected through the transmission line 26 into this positive feedback path to exercise effective control over the frequency of the oscillator 32. The transformer 22 provides an optimizing match between the mechanical/electrical characteristics of the vibrating wire and the electrical characteristics of the oscillator so as to assure strong oscillations and good efficiency of operation. The square-wave currents produced by the oscillator are used to drive the transmission line 26 and the transformer 22 to force the wire to be driven back and forth at its resonant frequency, in accordance with the tension applied to the wire 12 by the force F.

The square-wave signal developed by the oscillator 32 is used to produce a pair of corresponding square-wave switch-control signals which are 180° out of phase with one another. For this purpose, the oscillator signal at the top of the voltage-divider resistor 60A is coupled through a resistor 78 to a set of four NOR gates generally indicated at 80, and which may be of the type available commercially as Model CD4001AD, from RCA. Each of the NOR gates has one input connected to circuit common 72. The oscillator square-wave signal is coupled to the other input of the upper NOR gate 82, the output of which is a square-wave signal 180° out of phase from the oscillator signal. This gate output is fed to the second NOR gate 84 to produce an output square-wave in phase with the original oscillator signal. The latter signal is fed through two further NOR gates 86, 88 to produce, on leads 34, 36, respective further-sharpened switch-control signals (SW "A" and "B"), 180° out of phase with one another, to be used in controlling the frequency-to-current converter 38, as will be described hereinbelow.

The frequency-to-current converter 38 is based on the use of capacitor charge-and-discharge circuitry of the general type described in U.S. Pat. No. 3,948,098, and therefore the description herein of that aspect will be relatively brief. Such converter circuitry comprises a pair of series-connected alternatively-operated switches 100, 102 each bridged by corresponding equal-valued storage capacitors 104, 106 to be energized by a source of EMF, in this case the differential voltage $V_D$ between a fixed bias voltage $V_b$ at the current summing terminal 108 of an operational amplifier 110, and the potential of a reference lead 112 connected in this embodiment to the circuit common 72. The switches illustratively are FET transistors, with their gates connected to the switch-control signal leads 34, 36 (SW "A" and "B") to provide for alternate switch operation.

When the first switch 100 is closed, the second capacitor 106 is charged to the voltage $V_D$ while the first capacitor 104 is discharged. On the next half-cycle, the first capacitor is charged to the voltage $V_D$, and the other capacitor is discharged. This charging/discharging operation produces a flow of d-c current from the terminal 108 to the reference lead 112. The current is proportional both to the differential voltage $V_D$ (fixed, for this set of switches) and to the frequency of switch operation, i.e. the frequency of vibration of the wire 12. In effect, the switch-and-capacitor circuitry just described forms a controllable d-c current source arranged to develop uniform-sized increments of electrical energy (the charges on the capacitors) and to release those increments of energy at a rate proportional to the frequency of the alternating square-wave signal from the oscillator 32. The higher the frequency, the more frequent are the charge/discharge cycles. The average value of the resulting d-c signal thus is proportional to the frequency of the square-wave signal.

The amplifier 110 also is provided with a negative feedback resistor 114 connected between the summing terminal 108 and a span-adjusting network 116 at the output of the amplifier. This network includes a potentiometer 118, to the movable arm of which the feedback resistor 114 is connected, and two pairs of jumper terminals 120 to provide further range of adjustment. The amplifier continuously operates to maintain the potential at the summing terminal 108 essentially equal to that of the other input terminal 122 ($V_b$), by changing the output voltage V, on the output lead 124, as necessary to hold the feedback current equal to the net current supplied to the summing terminal. Thus, the amplifier output voltage V will be a function both of the net current supplied to the summing terminal (which in turn is proportional to frequency) and of the setting of the span-adjusting network 116.

In order to provide for zeroing the transmitter output at a nominal wire vibration frequency corresponding to zero applied force, the current-summing terminal 108 is supplied with an adjustable but constant bias current $I_b$ from a resistor network 126 connected to a positive voltage supply lead $V_z$. This bias current is set to be equal to the average current drawn from terminal 108 by the capacitor-switch circuitry 100-106 when the vibratory frequency of the wire 12 is at its lowest operating level (typically about 1500 Hz), corresponding to an applied force F of zero and a preselected bias force produced by a bias spring or the like (not shown). Under these conditions the bias current in effect cancels the capacitor-charging current, and no current flows through the feedback resistor 114. Thus, the amplifier output voltage will be equal to $V_b$, regardless of the setting of the span-adjusting network 116. Accordingly, it will be seen that the zero and span adjustments are non-interactive.

The mathematical expression for the amplifier output voltage is:

$$V=a(f-f_o)+V_b \qquad \text{Eq. (1)}$$

where f=switching frequency $F_o$=switching frequency at null (zero)

a=span constant

Since this voltage is proportional to the frequency of wire vibrations, the amplifier output voltage V provides a measure of the tension force F applied to the wire 12. However, the relationship between voltage V and force F is non-linear, and thus the use of voltage V as a measurement signal is not satisfactory for many important applications, including process instrumentation systems.

It has been proposed to avoid the effects of this non-linearity by employing two separate vibrating wires to which unknown and reference force are applied in a comparative arrangement where the non-linear effects in the two wires tend to cancel. Such construction, however, involves substantial complexities and is generally unsuitable for the requirements of industrial process instruments.

The present invention has solved the problem of non-linearity by a quite different approach. Thus in accordance with an important aspect of this invention, the disclosed apparatus includes electronic means for operating on the amplifier output voltage V to introduce other factors into the final measurement signal so as to produce the effect of a quite linear relationship between the measurement signal and the unknown force F. The operations performed on the voltage V serve to create a frequency-to-current transfer function which closely matches the relationship between the wire tension and its resonant frequency, which relationship can be expressed in the following form:

$$T=A_1f^2+A_2f+A_3 \qquad \text{Eq. (2)}$$

(where $A_1$, $A_2$ and $A_3$ are proportionality constants).

To perform the above-mentioned operation on the voltage V, this voltage is directed to two conditioning circuits 130, 132 which produce corresponding currents $I_q$ and $I_s$ at a summing junction 134 connected to an operational amplifier 136. (These two currents can together be considered $I_{SIG}$ referred to in FIG. 1.) The upper circuit 130 consists of a resistor 140, so that the current $I_q$ it delivers to junction 134 is directly proportional to $V-V_b$, i.e. $I_q=(V-V_b)/R_{140}$. Since from Eq. (1), $V-V_b=a(f=f_o)$ then $$I_q=b(f-f_o) \qquad \text{Eq. (3)}$$

where b is a proportionality constant.

The other conditioning circuit 132 comprises a switched-capacitor charge/discharge controllable-current source like the circuitry 100-106 previously described, and which also is controlled by the squarewave switch-control signals SW "A" and "B". The potential of the summing junction 134 is held fixed at $V_b$ by the feedback action of the operational amplifier 136 (see below), so that the net charging voltage applied to the switched-capacitor circuit 132 is $V-V_b$. Thus, the second conditioning circuit 132 delivers to junction 134 a current $$I_s=c(V-V_b)f=ca(f-f_o)f \qquad \text{Eq. (4)}$$

where c is a proportionality constant.

Combining $I_s$ and $I_q$, we have $$I_s+I_q=ca(f-f_o)f+b(f-f_o)$$

$$I_s+I_q=caf^2-caff_o+bf-bf_o$$

$$I_s+I_q=B_1f^2+B_2f+B_3 \qquad \text{Eq. (5)}$$

(where $B_1$, $B_2$ and $B_3$ are proportionality constants).

A third current $I_2$, of fixed but settable magnitude, also is delivered to the summing junction 134 by an adjustable resistor 142 for the purpose of developing a "live zero" output current (e.g. 4 ma.) for the transmitter, as will become apparent below. This current $I_z$ has the effect of augmenting the third term $B_3$ in the above equation, leaving the equation still in the same basic form.

The sum of the three currents, $I_z$, $I_q$ and $I_s$ will be equal to the feedback current $I_{fb}$ leaving the summing junction 134 through a feedback resistor 144. This feedback current is combined with the load current $I_L$ from the output power transistor 146 and a load resistor 148 to produce the output measurement signal $I_o$. This portion of the transmitter is similar to that shown in the abovementioned U.S. Pat. No. 3,948,098, and hence will not be described herein in detail. In brief, the operational amplifier 136 controls the power transistor 146 so as to adjust the transmitter output voltage $E_o$ to the value which makes the measurement signal $I_o$ essentially directly porportional to the feedback current $I_{fb}$, which in turn is equal to the sum of the three currents $I_z$, $I_q$ and $I_s$. Thus it will be apparent that the feeback current $I_{fb}$, and the measurement signal current $I_o$, are functions of the switching frequency f, of the same form as equation (5) above.

It has been found that this circuit arrangement provides for quite effective linearization of the relationship between the unknown force F and the transmitter output current $I_o$. A significant aspect of this arrangement is that the output signal is provided with a component which is a multiple function of frequency. In the disclosed embodiment, this signal component is proportional to the square of the frequency. That is, the conditioning circuitry 132 performs a multiplication function to multiply the frequency-responsive signal V and the frequency-signal from the oscillator 32, thereby producing a signal component representing the product of these two signals, i.e. a signal component proportional to $f^2$. The circuitry also introduces a component directly proportional to frequency, as well as a constant.

Returning now to the detailed description of the preferred embodiment, the bias voltage $V_b$ is generated by a circuit generally indicated at 160 and including a resistive voltage-divider 162, 164 connected between the positive supply voltage $V_z$ and circuit common 72. The junction of these resistors produces a reference voltage, below $V_z$, which is applied to one terminal of an operational amplifier 166 having a feedback connection to its other input terminal so that its output voltage is held at the reference voltage. The amplifier maintains $V_b$ at a low output impedance for the various uses made of $V_b$ throughout the circuit. In one embodiment of the invention, the positive level 70(V+) was at 8 volts above circuit common, the supply voltage $V_z$ was 6.4 volts above common, and $V_b$ was 2 volts above common.

The regulated power supply 48 can be of various kinds known in the art, and therefore no detailed description of the functioning of the circuit shown in FIG. 2 will be included. It may be noted in passing, however, that the potential of V+ is regulated by an operational amplifier 170 controlling an FET transistor 172 in series with the supply lead, and that the other supply voltage $V_z$ is regulated by a Zener diode 174 supplied through a resistor 176.

In the above specification and the appended claims, references to a vibrating "wire" should be construed as meaning any kind of vibrating element having the characteristics described for producing vibrations at a frequency corresponding to an applied force, whether or not such element would ordinarily be called a wire.

Although a preferred embodiment of the invention has been described herein in detail, it is desired to emphasize that this is for the purpose of illustrating the principles of the invention, and should not necessarily be construed as limiting of the invention since it is apparent that those skilled in this art can make many modified arrangements of the invention without departing from the true scope thereof.

We claim:

1. Transmitter apparatus for use in an industrial process instrumentation system to produce a d-c measurement signal responsive to the vibration frequency of a vibrating-wire force-sensor the wire of which is tensioned in accordance with an unknown force; and wherein said d-c signal is connected through a two-wire line to a signal responsive load and a d-c source which furnishes over said two-wire line all of the power for said transmitter apparatus; said transmitter apparatus comprising:

a first pair of terminals to receive respective leads coupled to said vibrating wire;

a second pair of terminals connected respectively to the leads of said two-wire line to receive power from said d-c source and to carry the d-c measurement signal;

power supply means coupled to said second pair of terminals to develop at least one supply voltage;

electronic circuit means coupled to said first pair of terminals to produce vibratory movement of said wire at a frequency in accordance with the tension thereof and to develop an alternating signal corresponding to that frequency;

function-generating means responsive to said alternating signal and operable to produce a control signal which corresponds to a multiple function of the frequency of said alternating signal;

amplifier means having input and output circuits;

means coupling said control signal to said amplifier means input circuit;

means coupling said amplifier means output circuit to said second pair of terminals to control the d-c current flowing through those two terminals in accordance with the control signal applied to said input circuit;

a feedback signal coupling said output circuit of said amplifier means to said input circuit to establish correspondence between said control signal and the d-c current flowing in said two-wire output circuit; and means coupling said power supply means to said electronic circuit means, to said function-generating means, an to said amplifier means, to furnish operating supply voltages thereto.

2. Apparatus as claimed in claim 1, wherein said electronic circuit means comprises an oscillator the frequency of which matches that of the wire vibration;

frequency-to-analog conversion means coupled to said oscillator for developing a d-c analog signal proportional to the frequency of oscillation;

multiplier means having two inputs responsive respectively to a frequency signal and an analog signal, said multiplier means including means for producing an output analog signal corresponding to the multiplication of the values represented by the input frequency signal and the input analog signal supplied thereto;

means for directing said d-c signal from said conversion means to one input of said multiplier means; and means for directing to the other input of said multiplier means a frequency signal corresponding to said alternating signal;

whereby the output analog signal can serve as at least a component of said control signal for said amplifier means.

3. Apparatus as claimed in claim 2, wherein said amplifier means input circuit comprises a summing terminal to which said output analog signal is coupled; and means for supplying to said terminal a d-c signal responsive proportionately to the frequency of said alternating signal as an additional component of said control signal;

whereby said control signal provides a transfer function proportional to the sum of two factors one of which corresponds to the square of said frequency and the other corresponds to a linear function of said frequency.

4. Apparatus as claimed in claim 3, including means to supply to said summing junction a current component of fixed magnitude.

5. Apparatus as claimed in claim 1, wherein said function-generating means comprises means to include in said control signal a first component proportional to the square of the frequency, and a second component linearly proportional to the frequency.

6. Apparatus as claimed in claim 5, wherein said function-generating means includes means to include in said control signal a component of fixed magnitude.

7. Apparatus as claimed in claim 1, wherein said function-generating means includes frequency-to-analog converter means for developing a d-c analog signal proportional to the frequency of said alternating signal;

multiplier means responsive to said d-c analog signal and to said alternating signal for producing a component in said control signal proportional to the product thereof;

means to incorporate with said d-c analog signal a second component which is fixed in magnitude; and means to vary said second component magnitude to provide for adjustment of the instrument zero-setting.

8. Apparatus as claimed in claim 7, including gain-adjusting means coupled to said multiplier means to provide for adjustment of the instrument span.

9. Industrial process instrument apparatus for developing at one station an electrical signal responsive to the value of a process condition at a field measurement location remote from said one station, said process condition being represented at said measurement location by a force proportional to the value of such condition; said instrument apparatus comprising:

a relatively thin, elongate element at said measurement location, said element being formed of a material dimensioned to provide lateral bending flexibility;

means for supporting said element in a tensioned state providing for resonant lateral vibration of said element the tension force of said element being variable in accordance with changes in the value of said condition, thereby to alter correspondingly the resonant vibratory frequency of said element;

a two-wire transmission line with the leads at one end thereof coupled to said elongate element to provide for supplying excitation power to said wire;

said two-wire transmission line extending from said field measurement location to said one station;

electronic means including wire-excitation means at said one station for producing oscillatory electrical energy to be supplied to said vibratory element and to produce a corresponding signal responsive to frequency;

means at said one station coupling the other end of said transmission line to said electronic means, the resonant characteristics of said vibratory element being reflected through said transmission line at an impedance level to interact with said electronic means to control the frequency thereof at the resonant vibratory frequency of said element with electrical energy from said electronic means being coupled through said transmission line to said vibratory element to maintain said element vibrating at said resonant frequency; and means for producing an output measurement signal at said one station corresponding to the oscillatory frequency of said electronic means.

10. Apparatus as claimed in claim 9, wherein said wire-excitation means comprises an oscillator to which said transmission line is coupled so that the oscillator frequency is controlled by the resonant characteristics of said element as reflected through said transmission line.

11. Apparatus as claimed in claim 10, wherein the leads at said one transmission line end are connected to longitudinally-spaced points of said element.

12. Apparatus as claimed in claim 11, including a transformer coupling said transmission line to said vibratable element.

13. Apparatus as claimed in claim 12, wherein said transformer is at said remote location.

14. Apparatus as claimed in claim 13, wherein said transformer has a relatively high turns ratio, with the smaller number of turns coupled to said element.

15. Apparatus as claimed in claim 9, wherein said electronic means at said one station comprises:

means to adjust the zero and span settings of said output measurement signal whereby the adjustments can be made remotely from said field measurement location.

16. Apparatus as claimed in claim 15, wherein said electronic means comprises frequency-to-current converter means to develop a d-c current corresponding to the frequency of vibration of said element;

said zero-setting means comprising means to combine with said d-c current a second adjustable d-c current to produce a net zero current at a given vibration frequency.

17. Apparatus as claimed in claim 16, wherein said electronic means further comprises an amplifier responsive to said combined d-c currents;

said span-adjusting means comprising means to alter the effective gain of said amplifier, whereby there is no interaction between the settings of said span-adjusting means and said zero-adjusting means.

18. Industrial process instrument apparatus for developing at an instrument station an electrical signal responsive to the value of a process condition at a field measurement location remote from said instrument station, said process condition being represented at said measurement location by a force proportional to the value of such condition; said instrument apparatus comprising:

a relatively thin, elongate element at said measurement location, said element being formed of an electrically-conductive material dimensioned to provide lateral bending flexibility;

means for supporting said element in a tensioned state providing for resonant lateral vibration of said element, the tension force of said element being variable in accordance with changes in the value of said condition, thereby to alter correspondingly the resonant vibratory frequency of said element;

permanent magnet means for producing a magnetic field through said element transverse to the longitudinal axis thereof;

a two-wire transmission line with the leads at one thereof coupled respectively to longitudinally-separated portions of said elongate element to form a conductive path for a-c current passing through said transmission line and said elongate element in series;

said two-wire transmission line extending from said measurement location to said instrument station;

electronic means at said instrument station comprising an amplifier with a positive feedback circuit adapted to serve as an oscillator;

means at said instrument station coupling the transmission line to said oscillator feedback circuit, the resonant characteristics of said vibratory element being reflected through said transmission line at an impedance level to interact with said positive feedback circuit so as to establish oscillations of said oscillator and control the frequency thereof at the resonant vibratory frequency of said element with electrical energy from said oscillator being coupled through said transmission lines to said vibratory element to maintain said element vibrating at said resonant frequency; and means for producing an output measurement signal at said instrument station corresponding to the oscillatory frequency of said oscillator.

19. Industrial process instrument apparatus for developing an electrical signal responsive to the value of a process condition at a field measurement location, said process condition being represented at said measurement location by a force proportional to the value of such condition; said instrument apparatus comprising:

a relatively thin, elongate element at said measurement location, said element being formed of a material dimensioned to provide lateral bending flexibility;

means for supporting said element in a tensioned state providing for resonant lateral vibration of said element, the tension of said element being variable in accordance with changes in the value of said condition, thereby to alter correspondingly the resonant vibratory frequency of said element;

a first two-wire line coupled at one end thereof to said elongate element;

electronic means coupled to the other end of said first two-wire line and including wire-excitation means for producing oscillatory electrical energy to be supplied over said first two-wire line to said vibratory element and to produce an a-c signal corresponding to the frequency of vibration;

a second two-wire line coupled at one end thereof to said electronic means;

d-c power supply means coupled to the other end of said second two-wire line to produce a flow of d-c current therethrough to supply all of the electrical power to said electronic means;

said electronic means further including control means responsive to the frequency of said a-c signal for controllably altering said d-c current so that the magnitude thereof reflects the frequency of vibration of said element, thereby to represent said force applied to said element.

20. Apparatus as in claim 19, wherein said control means comprises means responsive to said a-c signal for developing a control signal in accordance with the frequency of said a-c signal;

bias means for setting the magnitude of said control signal at zero corresponding to a frequency of vibration of said element when said force is zero;

said control means further including signal-adjusting means connected to said second two-wire line and responsive to said control signal for setting the magnitude of said d-c current in correspondence to said control signal.

21. Apparatus as in claim 20, including means coupled to said signal-adjusting means to set the value of said d-c current at a predetermined magnitude when the value of said control signal is zero, to provide a "live zero" output signal for the instrument apparatus.

22. Apparatus as in claim 21, wherein said control signal is developed in the form of a d-c signal.

23. Transmitter apparatus for use in an industrial process instrumentation system to produce a measurement signal responsive to the vibration frequency of a vibrating-wire force-sensor which is tensioned in accordance with an unknown force, comprising:

terminal means to receive leads coupled to said vibrating-wire;

electronic means including wire-excitation means coupled to said terminals and supplied with electrical power to produce vibratory movement of said wire at a frequency in accordance with the tension of said wire;

said wire-excitation means comprising an oscillator the frequency of which is controlled to the vibratory frequency of said wire;

frequency-to-analog conversion means coupled to said oscillator for developing a d-c signal proportional to the frequency of oscillations;

function-generating means comprising multiplier means including frequency-to-analog conversion means and having two inputs, one of said inputs receiving a signal corresponding to said frequency of oscillation, the other input receiving said d-c signal, said multiplier means producing an output porportional to the product of the signal values applied to said inputs providing a non-linear transfer-function characteristic at least substantially matching the transfer characteristic between the force applied to said wire and its resonant vibratory frequency; and means coupled to the output of said function-generating means for developing a measurement signal corresponding to the output of said multiplier means and having a characteristic which is effectively linear with respect to changes in the tension of said wire;

both of said frequency-to-analog conversion means being of the type comprising a controllable d-c current source means with means for developing uniform-sized increments of electrical energy and for releasing said energy at a rate proportional to frequency.

24. Transmitter apparatus for use in an industrial process instrumentation system to produce a measurement signal responsive to the vibration frequency of a vibrating-wire force-sensor which is tensioned in accordance with an unknown force, comprising:

terminal means to receive leads coupled to said vibrating-wire;

electronic means including wire-excitation means coupled to said terminals and supplied with electrical power to produce vibratory movement of said wire at a frequency in accordance with the tension of said wire;

said wire-excitation means comprising an oscillator the frequency of which is controlled to the vibratory frequency of said wire;

said electronic means further including means to produce a first signal proportional to said frequency of vibration;

function-generating means coupled to said first signal producing means to produce a second signal responsive to a multiple function of said frequency of vibration providing a non-linear transfer-function characteristic at least substantially matching the transfer characteristic between the force applied to said wire and its resonant vibratory frequency;

said function generating means comprising multiplier means having two inputs each receiving a signal corresponding to said frequency of oscillations, said multiplier means producing an output proportional to the product of the signal values applied to said inputs;

first means to direct to one of said inputs a signal having at least a component proportional to frequency;

second means to direct to the other of said inputs a signal which is proportional to frequency, whereby the output of said multiplier means represents a squared function of frequency;

third means to combine with the output of said multiplier a signal component which is directly proportional to frequency; and means coupled to the output of said function-generating means for developing a measurement signal corresponding to said second signal and having a characteristic which is effectively linear with respect to changes in the tension of said wire.

25. Apparatus as claimed in claim 24, wherein said first means comprises a frequency-to-analog conversion means.

26. Apparatus as claimed in claim 25, wherein said second means comprises a frequency-to-analog conversion means like said first means.

27. Transmitter apparatus for use in an industrial process instrumentation system to produce a measurement signal responsive to the vibration frequency of a vibrating-wire force-sensor which is tensioned in accordance with an unknown force, comprising:

terminal means to receive leads coupled to said vibrating-wire;

electronic means including wire-excitation means coupled to said terminal means and supplied with electrical power to produce vibratory movement of said wire at a frequency in accordance with the tension of said wire;

said electronic means further including means to produce an alternating signal proportional to said frequency of vibration;

first multiplier means comprising first input means to receive a d-c signal and second input means coupled to said electronic means to receive an alternating output signal derived from said alternating signal, said first multiplier means including switch means operable by said alternating output signal and responsive to said d-c signal to produce a first analog output signal proportional to the product of said d-c signal and the frequency of said alternating output signal;

power supply means supplying a fixed magnitude d-c signal to said first input means of said first multiplier means whereby said first analog output signal is proportional to the wire vibration frequency;

second multiplier means comprising third input means coupled to the output of said first multiplier means to receive a d-c signal derived from said first analog output signal, and fourth input means coupled to said electronic means to receive an alternating output signal derived from said alternating signal, said second multiplier means including switch means operable by the received alternating output signal and responsive to the d-c signal supplied to said third input means to produce a second analog output signal proportional to the product of the d-c signal and the frequency of the alternating output signal supplied to said second multiplier means, said second analog output signal having a magnitude proportional to the square of the frequency of wire vibration; and output means coupled to said second multiplier means to produce a measurement signal responsive to said second analog output signal.

28. Apparatus as claimed in claim 27, including zero-setting means to provide as a component of said first analog output signal a signal of adjustable magnitude permitting adjustment of the zero of the instrument.

29. Apparatus as claimed in claim 28, including span-setting means to adjust the magnitude of the d-c signal supplied to said second multiplier means, relative to the magnitude of said first analog output signal, thereby to alter the span of the instrument without causing interaction with the zero-setting.

30. Apparatus as claimed in claim 29, wherein said span-setting means comprises an adjustable gain amplifier receiving said first analog output signal at its input, and producing at its output the d-c signal supplied to said second multiplier means.

31. Apparatus as claimed in claim 27, including means to direct to said output means a signal component proportional to said first analog output signal to produce a corresponding component in said measurement signal, whereby the measurement signal includes components proportional both to the square of said frequency and to a linear function of the frequency.

32. Apparatus as claimed in claim 31, including means to direct to said output means a signal component of fixed but preselected magnitude to produce a corresponding component in said measurement signal.

*33. Industrial process instrument apparatus for developing an electrical signal responsive to the value of a process condition at a field measurement location, said process condition being represented at said measurement location by a force proportional to the value of such condition; said instrument apparatus comprising:*

*a relatively thin, elongate element at said measurement location, said element being formed of a material dimensioned to provide lateral bending flexibility;*

*means for supporting said element in a tensioned state providing for resonant lateral vibration of said element, the tension of said element being variable in accordance with changes in the value of said condition, thereby to alter correspondingly the resonant vibratory frequency of said element;*

*a first two wire line coupled at one end thereof to said elongate element;*

*electronic means coupled to the other end of said first two-wire line and including wire-excitation means for producing oscillatory electrical energy to be supplied over said first two-wire line to said vibratory element and to produce an a-c signal corresponding to the frequency of vibration;*

*a second two-wire line coupled at one end thereof to said electronic means;*

*d-c power supply means coupled to the other end of said second two-wire line to produce a flow of d-c current therethrough to supply all of the electrical power of said electronic means; and*

*control means responsive to the frequency of said a-c signal for controllably altering said d-c current so as to produce a signal representing the frequency of vibration of said element, thereby to represent said force applied to said element.*

* * * * *